US006934912B2

(12) United States Patent
Simpson et al.

(10) Patent No.: US 6,934,912 B2
(45) Date of Patent: Aug. 23, 2005

(54) SYSTEM AND METHOD FOR PROVIDING A HISTORY LIST OF EXISTING IMAGING COMPOSITIONS

(75) Inventors: Shell S. Simpson, Boise, ID (US); Ward S. Foster, Boise, ID (US); Todd A. Fischer, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 533 days.

(21) Appl. No.: 09/874,409

(22) Filed: Jun. 4, 2001

(65) Prior Publication Data

US 2002/0180785 A1 Dec. 5, 2002

(51) Int. Cl.[7] .................................................. G09G 5/00

(52) U.S. Cl. ...................... 715/745; 715/738; 715/810; 715/811; 715/514; 715/515

(58) Field of Search ................................. 345/738, 735, 345/745; 715/738, 745, 514, 515, 810, 811

(56) References Cited

U.S. PATENT DOCUMENTS

| 5,903,889 A | * | 5/1999 | de la Huerga et al. ........... 707/3 |
| 6,049,812 A | * | 4/2000 | Bertram et al. .............. 715/516 |
| 6,144,997 A | | 11/2000 | Lamming et al. ............ 709/217 |
| 6,195,679 B1 | * | 2/2001 | Bauersfeld et al. .......... 709/203 |
| 6,633,316 B1 | * | 10/2003 | Maddalozzo et al. ........ 345/854 |
| 6,670,974 B1 | * | 12/2003 | McKnight et al. ........... 345/855 |

* cited by examiner

*Primary Examiner*—Ba Huynh
*Assistant Examiner*—Sara Hanne (57) ABSTRACT

The present invention provides an improved for providing a history list of existing imaging compositions having links to imaging data that is serviced as a single unit that can be later retrieved by the user associated with the history list. The present invention includes a history list of existing imaging compositions, which has links to imaging data that are serviced as a single unit. The present invention further includes a personal imaging repository having a composition store for storing the history list and the existing imaging compositions, and it acts as an exchange infrastructure between the imaging data and available web services on the Internet. The composition store of the personal imaging repository also maintains the history list.

17 Claims, 5 Drawing Sheets

SYSTEM AND METHOD FOR PROVIDING A HISTORY LIST OF EXISTING IMAGING COMPOSITIONS

The present invention generally relates to an improved system and method for providing a history of existing imaging compositions that can be reactivated. More specifically, it relates to an improved system and method for providing a history of existing imaging compositions that can be retrieved by users of a client computer.

End-users of computer systems often desire a history of their previous actions or requests. For example, most web browsers, such as Internet Explorer®, generally keep a history of previously visited web sites. Microsoft Windows®, a computer operating system, also provides a list of recently accessed documents. However, the history provided by these applications does not relate to previously printed imaging information, such as when a set of data is printed or faxed.

Currently, various personal computer based fax solutions and standalone fax solutions keep a history of previously sent faxes. However, the only function provided by these history lists is more or less simply a record keeping system. The previously sent faxes includes simple function, such as resenting the fax to the specified destination. As a result, its design and functionality cannot be applied to more complex systems that are implemented using the Internet. The necessity for a history relating to printed imaging information that gives the user more options and functionality will become more important as the computers become more integrated with the Internet.

A history of the printed imaging data is extremely useful since the printed imaging data can include several images coming from distinct sources, which makes it broader than the traditional notion of a print job relating to peripheral devices, such as a printer. The printed imaging data serviced as a single unit will be referenced by an "imaging composition," which contains links to each imaging data that was serviced in the single unit. For example, a printed imaging data can include a letterhead image, a letter image, and a postage image. In this example, a user can compose a letter (the letter imaging data), and add the company's letterhead (the letterhead imaging data) to the letter. Once the letter is ready, the user can then purchase a digital postage (the postage imaging data) over the Internet for the letter. It should be understood that the term "imaging data" as used herein refers digital data capable of being represented as two dimensional graphics, such as a Portable Document Format ("PDF") file or a Joint Photographic Experts Group ("JPEG") file.

BRIEF SUMMARY OF THE INVENTION

The present invention generally relates to an improved system and method for providing a history of previous imaging compositions. The system and method provide a way to track existing imaging compositions that can be utilized by web services at a later time.

The present invention provides an improved for providing a history list of existing imaging compositions having links to imaging data that is serviced as a single unit that can be later retrieved by the user associated with the history list. The present invention includes a history list of existing imaging compositions, which has links to all imaging data that are serviced as a single unit. The present invention further includes a personal imaging repository having a composition store for storing the history list and the existing imaging compositions, and it acts as an exchange infrastructure between the imaging data and available web services on the Internet. The composition store of the personal imaging repository also maintains the history list.

The present invention further provides a method that includes the steps of receiving a new imaging composition from a network service, saving the new imaging composition to the composition store, adding the new imaging composition to the history list, and providing the history list to the user associated with the personal imaging repository responsive to a request for the history list.

GLOSSARY OF TERMS AND ACRONYMS

The following terms and acronyms are used throughout the detailed description:

Client-Server. A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on the computer of a user; the program which responds to browser requests by serving Web pages, or other types of Web content, is commonly referred to as a "Web server."

Composition store. Composition store refers to a network service or a storage device for storing imaging composition(s) that can be accessed by the user or other web services.

Content. A set of executable instructions that is served by a server to a client and that is intended to be executed by the client so as to provide the client with certain functionality. Web content refers to content that is meant to be executed by operation of a Web browser. Web content, therefore, may non-exhaustively include one or more of the following: HTML code, SGML code, XML code, XSL code, CSS code, Java applet, JavaScript and C-"Sharp" code.

Exchange infrastructure. An exchange infrastructure is a collection of services distributed throughout a network that stores imaging data associated with a particular user through a user profile.

Hyperlink. A navigational link from one document to another, from one portion (or component) of a document to another, or to a Web resource, such as a Java applet. Typically, a hyperlink is displayed as a highlighted word or phrase that can be selected by clicking on it using a mouse to jump to the associated document or document portion or to retrieve a particular resource.

Hypertext System. A computer-based informational system in which documents (and possibly other types of data entities) are linked together via hyperlinks to form a user-navigable "web."

Imaging composition. An imaging composition comprises links to imaging data serviced as a single unit.

Imaging data. Imaging data refers to digital data capable of being represented as two dimensional graphics, such as a Portable Document Format ("PDF") file or a Joint Photographic Experts Group ("JPEG") file.

Imaging data store. Imaging data store refers to a network service or a storage device for storing imaging data that can be accessed by the user or other network services. The imaging data store preferably accepts the imaging data in multiple standard file formats, and the imaging data is converted into these file formats when necessary depending on the implementation.

Internet. A collection of interconnected or disconnected networks (public and/or private) that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Site. A computer system that serves informational content over a network using the standard protocols of the World Wide Web. Typically, a Web site corresponds to a particular Internet domain name, such as "HP.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users. Importantly, a Web Site can have additional functionality, for example, a Web site may have the ability to print documents, scan documents, etc.

HTML (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to display the document. Additionally in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc., 1995 (ISBN 0471-11894-4).

HTTP (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

URL (Uniform Resource Locator). A unique address which fully specifies the location of a file or other resource on the Internet or a network. The general format of a URL is protocol: //machine address:port/path/filename.

User Information. User information is identification and security information used in accessing imaging composition(s) and imaging data associated with a particular user profile. It is preferably accessed either directly or indirectly through methods provided by an extension component integrated into the web browser.

PDA (Personal Digital Assistant). A small hand-held computer used to write notes, track appointments, email and web browser with generally with far less storage capacity than a desktop computer.

Personal imaging repository. A personal imaging repository is a conceptual term describing the exchange infrastructure used to exchange imaging composition and imaging data with web services. Users are associated with their imaging data through user profiles.

DETAILED DESCRIPTION

Broadly stated, the present invention is directed to an improved system and method for providing a history list of existing imaging compositions that can be reactivated. The system and method allow existing imaging compositions to be retrieved for later usage, which avoids unnecessary user time to compose the imaging composition when the user simply wants to resend it. In addition, the present invention provides a history record of the existing imaging compositions for easy user reference.

Figure 1:
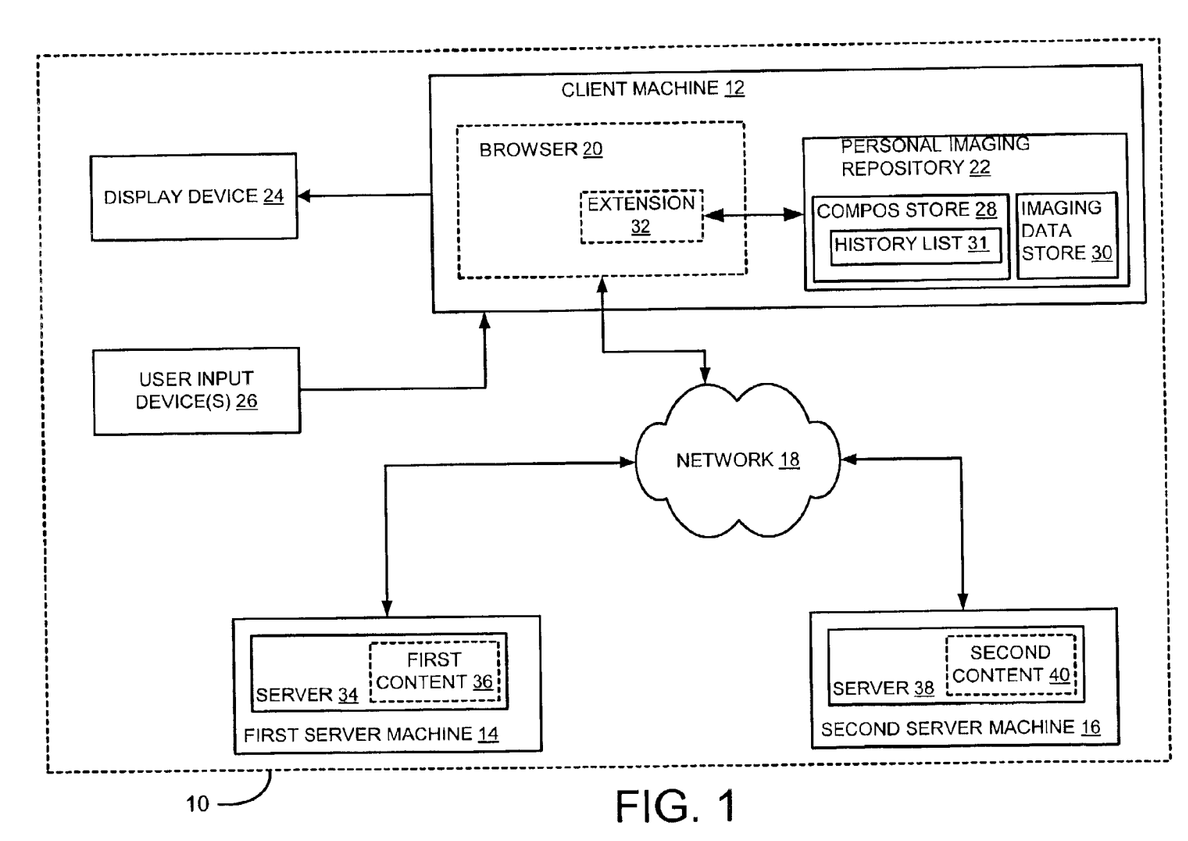
FIG. 1 is an architectural diagram of a client-server network system in which the present invention can be implemented.

Turning now to the drawings and particularly FIG. 1, a client-server network system in which the present invention can be implemented is shown and indicated generally at 10. A client machine 12 is connected to a first server machine 14 and a second server machine 16 via a network 18. Although two server machines 14, 16 are shown as examples, the preferred implementation would likely involve many server machines to which the client machine can access and communicate. The network 18 functions primarily allow the server and the client to communicate and transfer data, preferably but not necessarily using real time communication.

The Internet is the preferable network connection 18 because it provides a very flexible and universal way of communicating. However, the present invention can be implemented practically in any number of ways, ranging from a large scale network to a standalone personal computer, that may also change with evolving technology. To further the complexity of the various network types that may be available, issues of bandwidth, reliability and security of the network are important considerations. As a result, an explanation of the current preferred embodiment of the network topology is given as an example and other networks and connections are contemplated and within the scope of the present invention. In addition, for better readability, a client machine or server machine will be sometimes referred to. However, it should be understood that the use of "a" also refers to "one or more." Similarly, any references of imaging data or an imaging composition should be understood to mean one or more.

The client machine 12 includes a browser 20, a personal imaging repository 22, a display device 24 (e.g., a CRT monitor) and a user input device 26 (e.g., a keyboard and/or mouse). The personal imaging repository 22 includes a composition store 28 for storing imaging composition(s) of the imaging data that are serviced as a single unit and an imaging data store 30, i.e., digital memory, for storing the imaging data. An imaging composition preferably comprises links to the imaging data that are serviced as a single unit, which can be located at another web service's site. As a result, the composition store 28 stores only the imaging compositions. It is also preferred that a history list 31 of the existing imaging compositions is stored in the composition store. The imaging data store 30, on the other hand, is any imaging data store located on any computer that contains the imaging data. More specifically, each web service can have its own imaging data store available to the public.

For example, at some earlier time, a user may print an article from a web service site, resulting in an imaging composition being created and stored in the user's composition store 28. The imaging composition contains only the link to the imaging data for this article stored on the web service site. Consequently, the imaging data for the article is not in the imaging data store 30 located on the imaging client 12. Rather, the imaging data is stored in the imaging data store 30 located on the web service site. Of course, users will have an imaging data store 30 that belongs to their user identification where they can store imaging data, which is the imaging data store shown in the imaging client 12. As a result, the term "personal imaging repository" 22 is meant as a conceptual term for an exchange infrastructure between the imaging data and the available web services on the Internet. Similarly, the term "web" denotes millions of distinct servers that comprise the web. However, the web does not actually do anything itself. Similarly, the servers serving the composition store 28 and the imaging data store 30 are physical implementations of the personal imaging repository as a concept.

The composition store 28 also stores the history list 31 including the existing imaging compositions, which can be retrieved by a web service at a later time. Additionally, the browser 20 includes an extension component (extension) 32, which accesses user information for associating a particular user profile to the personal imaging repository, provides an interface between content executing in the browser 20 and the personal imaging repository 22.

It should be noted that the user profile can associate different users or groups to the personal imaging repository. For example, the user profile can associate a single user to a particular personal imaging repository, but, at the same time, this user can also have multiple user profiles, resulting in multiple personal imaging repository associated to a single user. Alternatively, the user profile can associate a group having multiple users to a particular personal imaging repository. The personal imaging repository, in this scenario, can be used by a group having a common association, such as a group project. As described, the user profile can be defined with great discretion and flexibility, and these other implementations are contemplated and within the scope of the present invention.

The first server machine 14 includes a first server 34. When the browser 20 of the client machine initiates a send request to the first server 34, a first content 36 is served by the first server to the browser. Each content 36 is preconfigured with specific instructions depending on the type of service the server machine serves. Similarly, the second server machine 16 includes a second server 38 with a second content. The servers can provide any kind of services. For example, a server can provide a peripheral device for the user to print their imaging composition. On the other hand, the server can be an auction web site, such as ebay.com, which makes an auction page for the user when a graphic file is printed to the web site. As one can see, the type of services and/or devices the servers can offer is limitless. In the present invention, the user can "print" to any one of services. As a result, the use of the word "print" is intended to be given a very board definition, which can be used with many available devices or services. Whatever the services and/or devices the servers provide, the content can include the instructions needed for the configuration.

It should be noted that the personal imaging repository 22 can represent any type of data storage device. In fact, the personal imaging repository 22 does not necessarily have to be located with the client machine. The personal imaging repository 22 can be located, for example, on another server machine that the client machine can access through the Internet or a Intranet. Although it is preferred currently to include the personal imaging repository 22 with the client machine 12, this would likely change as the bandwidth becomes faster and the popularity of the personal digital assistant ("PDA") increases. However, these alternative implementations that are more fitted for faster bandwidth and PDA are contemplated and should be considered within the scope of the present invention. One preferred embodiment that is more tailored to faster bandwidth or any client machine with limited storage capacity is shown in FIG. 2.

Figure 2:
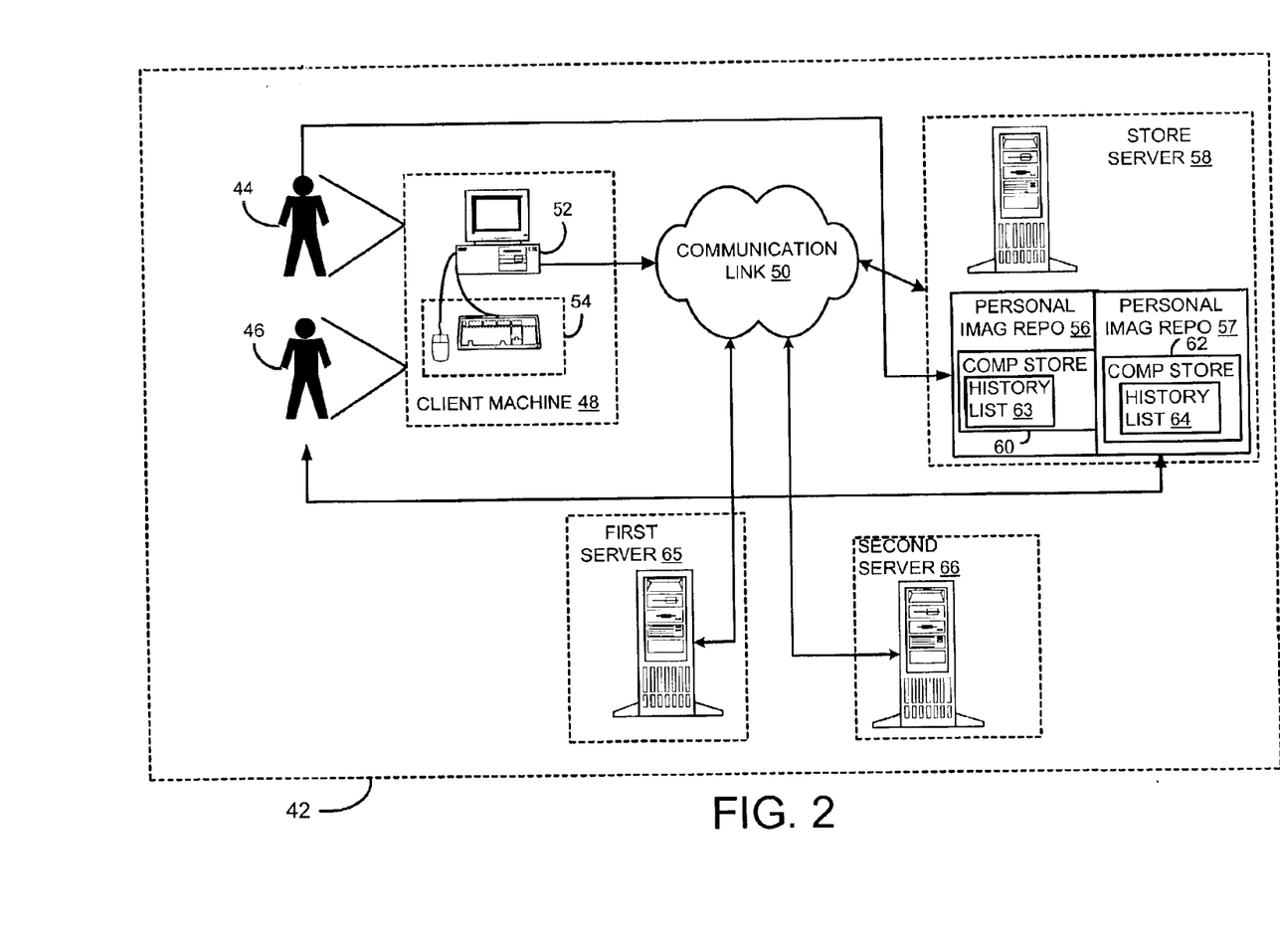
FIG. 2 is an architectural diagram of a second client-server network system in which the present invention can be implemented.

A second client-server network system is shown in FIG. 2, and indicated generally at 42. In this implementation, multiple users 44, 46 can utilize the same client machine 48 through a communication link 50, such as the Internet. Similar to the previous implementation, the client machine 48 includes a display device 52 (e.g., a CRT monitor) and a user input device 54 (e.g., a keyboard and/or mouse). However, unlike the previous server-client system 10, the personal imaging repositories 56, 57 are included on a second computer 58 (i.e., store server), which can also be a server computer or just a linked personal computer. Users 44, 46 are assigned profiles for accessing the personal imaging repository 56, 57 that belongs to them. For example, as shown in FIG. 2, user 44 will have access to the personal imaging repository 56, and user 46 will have access to the personal imaging repository 57. In each personal imaging repository 56, 57, there is preferably an imaging data store (not shown) and a composition store 60, 62 that stores the history list 63, 64.

Preferably, a first user 44 accesses the personal imaging repository 56 according to user information that is associated with a particular personal imaging repository that belongs to this first user. Once the first user has access to the composition store 60 of the personal imaging repository 56, the history list 63 can be retrieved by the user. Similarly, a second user 46 has access to the personal imaging repository 57 according to the user information that is associated with the second user's personal imaging repository. Consequently, the history list 64 that is stored in the second user's composition store 62 can be retrieved through the browser. In this implementation, users can access their history list from any computers that can access the same communication link. Since the Internet is the preferred communication link, it is possible for users to access these history lists and image data using a standard PDA and/or wireless web phone. In turn, the users can retrieve existing imaging compositions to request services from the first server 65 and/or the second server 66.

Figure 3:
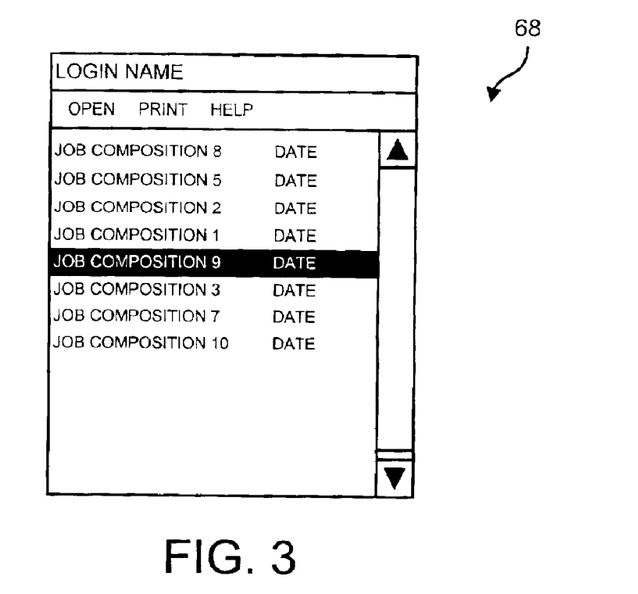
FIG. 3 illustrates an exemplary display image of the history list.

An exemplary display image of the history list is shown in FIG. 3 and indicated generally at 68. In the present invention, the history list can be retrieved by any of the web services for user usage. Furthermore, since each web service can provide different content depending upon the services that the web service provides, there may be a variety of options that can be included once the history list is displayed. However, since the configurations and services offered by these web services are outside the scope of the present invention, FIG. 3 is shown only as an example of how the history list can be retrieved for later usage.

In this example, a user name is indicated somewhere in the display image of the history list, since each history list is associated with user information associated with the personal imaging repository assigned to a particular user name. As shown, there are eight imaging compositions in this exemplary history list, and an imaging composition is currently selected from the list, specifically imaging composition 9. As shown, the user has multiple options once the imaging composition is selected. In this example, the user has the option of opening and/or printing the selected imaging composition. In addition, there is also a help option in case the user needs help using the history list.

Because the imaging composition is designed to include information relating to image data sent as a single unit, which can have multiple image data, the preferred embodiment of the imaging composition is to include only information on instructions and link references for these image data. Consequently, each actual image data may be stored in other locations having a different Uniform Resource Locators ("URL").

Figure 4:
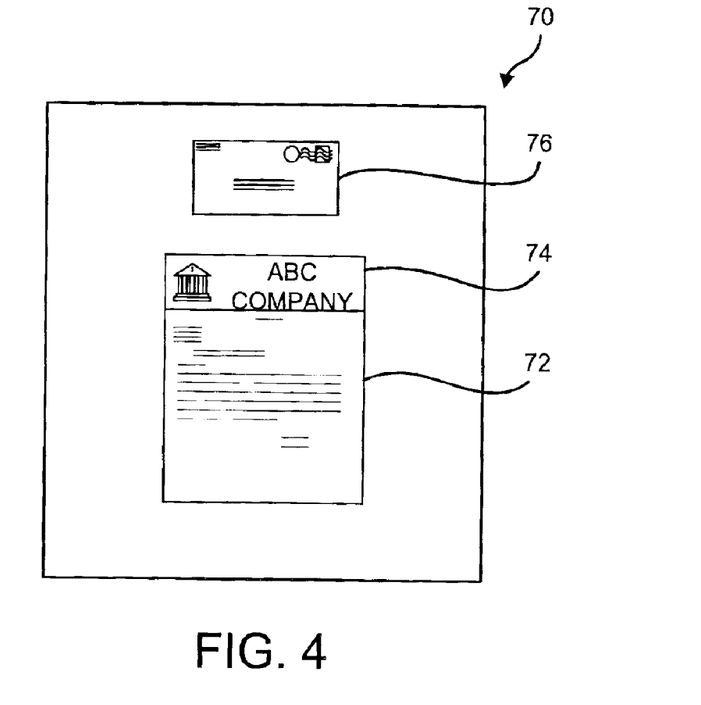
FIG. 4 illustrates an exemplary display of the image data from a selected imaging composition that is opened by the user.

An example display of the image data from a selected imaging composition is shown in FIG. 4, which is indicated generally at 70. In this example of the selected imaging composition, which was briefly discussed previously, there are three image data that were previously composed and sent as a single unit. The user writes a letter (letter image) 72 in a word processor, and a company letter logo (letterhead image) 74 is added to the letter. Then, the user accesses a website where postage for a package delivery can be purchased, the postage (the postage image) 76 can then be printed and taped to the package for delivery. As the United States Postal Office becomes more sophisticated with computers, stamps can already be purchased over the Internet.

In this given scenario, the user purchases the postage (postage image) 76 needed for the letter and adds it to the letter (letter image) 72. As the last step, the user sends all three image data (letter image 72, letterhead image 74, and postage image 76) as a single unit to another website service that will print and mail this letter for the user. When the user sends these image data as a single unit, an imaging composition will be created and stored in a history list, which can be revisited by the user at a later time.

Figure 5:
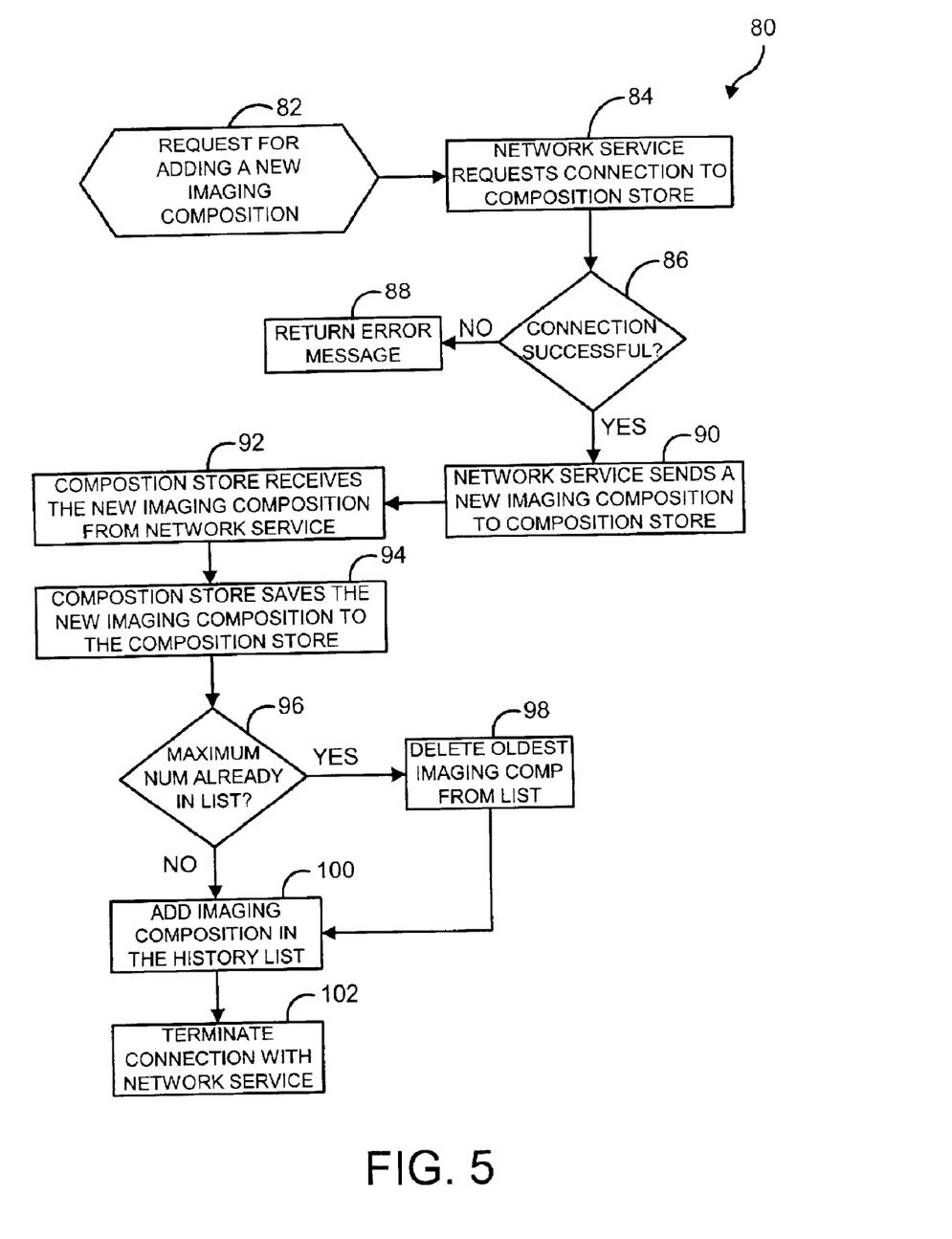
FIG. 5 is a flowchart illustrating the preferred subroutine of a history list maintenance process; and, FIG. 6 is a flowchart illustrating the preferred subroutine of a request process.

The manner in which the history list is maintained is shown in the flowchart of the preferred subroutine of a history list maintenance process in FIG. 5, indicated generally at 80. The history list maintenance process is initiated by a request for adding a new imaging composition from a network service (block 82). The network service first requests connection to the personal imaging repository that is associated with user information accessed by the extension component of the browser (block 84). It is next determined whether the connection with the network service is successful (block 86). When the connection is not successful (block 86), an error message will be returned to the user (block 88). If, however, the connection is successful, the network service accordingly sends a new imaging composition to the composition store (block 90).

After the composition store receives the new imaging composition (block 92), the new imaging composition will be saved in the composition store (block 94). Next, the composition store determines whether a predefined maximum number of existing imaging compositions are already in the history list (block 96). A predefined maximum number of imaging compositions is preferred in order to make the history list more manageable. Otherwise, there could be too many imaging compositions in the history list resulting in inefficient and ineffective usage of the list. If the predefined maximum number of imaging compositions are already in the history (block 96), the oldest imaging composition will be deleted from the list (block 98). Once there is space in the history list, the new imaging composition will be added to the list (block 100). The composition store then terminates the connection with the network service (block 102) to end the process.

It should be noted there are a wide array of ways to implement the maintenance of the history list. For example, other criteria to control the size of the list can be used. Furthermore, the system can also be configured to give users the option to choose and set up their own criteria. One example is to implement a criterion using the maximum lifetime of the compositions (e.g., compositions older than 10 days will be deleted). Similarly, another example may be to implement a criterion based on the combination of the maximum number in the list and maximum lifetime of the compositions (e.g., delete compositions older than 10 days but keep at least 5 compositions and no more than 12 compositions). In fact, the criteria can also be persistence (e.g., never automatically delete the compositions). These other implementations are contemplated, and should be considered to be within the scope of the present invention.

Figure 6:
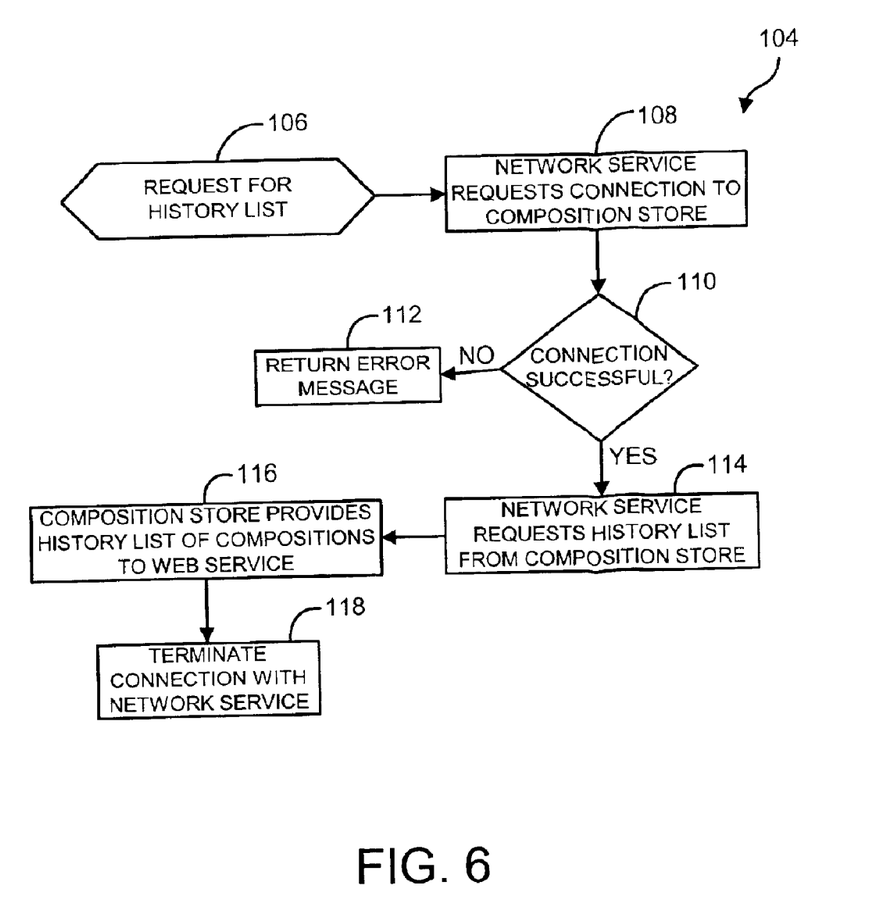

A flow chart of the preferred subroutine of a request for the history list process is shown in FIG. 6 and indicated generally at 104. This process is generally initiated by a network service request for the history list (block 106). The network service first requests a connection with the composition store (block 108). It is then determined whether the connection with the network service is successful (block 110). Again, if the connection is unsuccessful (block 110), an error message will be returned to the user to indicate the failed connection (block 112). Once a connection is established (block 110), the network service will accordingly request the history list from the composition store (block 114), which is provided to the network service (block 116). At this point, the composition store will terminate the connection with the network service (block 118), and end the process.

From the foregoing description, it should be understood that an improved system and method for providing a history list of existing imaging compositions has been shown and described, which has many desirable attributes and advantages. The system and method can allow users to retrieve existing imaging compositions from the history list. In addition, users also have a record of their imaging composition history for reference, which may be helpful for keeping track of the user's previous actions. The present invention allows users to easily access existing imaging compositions, which may otherwise take unnecessary user time to recreate.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A system for providing a history list of imaging compositions for a user, comprising:
   a history list of the imaging compositions, each imaging composition having links to imaging data to be serviced as a single unit, the imaging data associated with the user through a user profile;
   a composition store for storing said history list and said existing imaging compositions, wherein said composition store maintains said history list, and
   a personal imaging repository providing for the composition store an exchange infrastructure between the imaging data associated with the user and available web services.

2. The system as defined in claim 1 further comprising an extension component providing access to user information for associating a user profile to said personal imaging repository.

3. The system as defined in claim 1 wherein each imaging data included in said imaging composition is indicated by a Uniform Resource Locator.

4. The system as defined in claim 1 wherein said personal imaging repository further comprising an imaging data store for storing imaging data.

5. The system as defined in claim 4 wherein said imaging data store stores the imaging data in a plurality of file formats.

6. The system as defined in claim 5 wherein said personal imaging repository further comprising a converter for converting the imaging data to any of said plurality of file formats.

7. The system as defined in claim 5 wherein said plurality of file formats of said personal imaging repository is any one from the group consisting of:
   Joint Photographic Experts Group Format;
   Graphics Interchange Format;
   Portable Network Graphics Format;
   Tagged Image File Format;
   Portable Document Format; and,
   Microsoft Windows bitmap format.

8. The system as defined in claim 1 wherein said composition store receives and saves a new imaging composition in said history list.

9. The system as defined in claim 1 wherein said composition store adds a new imaging composition in said history list when a new imaging composition is saved in said composition store.

10. The system as defined in claim 1 wherein said history list has a predefined maximum number of imaging compositions allowed in a single history list.

11. The system as defined in claim 10 wherein said client computer deletes an oldest imaging composition from said history list to make space for adding a new imaging composition to said history list.

12. A method for providing a history list of imaging compositions for a user, comprising the steps of:
   receiving, on behalf of the user, a new imaging composition from a network service, the imaging composition having links to imaging data to be serviced as a single unit, the imaging data associated with the user through a user profile;
   saving said new imaging composition to a the composition store of a personal imaging respository associated with the user through the user profile;
   adding said new imaging composition to a history list maintained by the composition store; and,
   providing the history list to the user associated with the personal imaging repository responsive to a request for the history list.

13. The method according to claim 12 wherein prior to said step of receiving a new imaging composition further comprising the steps of:
   requesting connection to the composition store; and,
   determining whether connection to the network service is successful;
   returning an error message when the connection with the network service is not successful; and,
   sending a new imaging composition to the composition store when the connection with the network service is successful.

14. The method according to claim 12 wherein prior to said step of adding said imaging composition further comprising the steps of:
   determining whether a predefined maximum number of existing imaging compositions are already in said history list; and,
   deleting an oldest imaging composition from said history list only when said predefined maximum number of existing imaging compositions are already in said history list.

15. The method according to claim 12 wherein prior to the step of providing the history list further comprising the steps of:
   requesting connection to the composition store; and,
   determining whether connection to the network service is successful;
   returning an error message when the connection with the network service is not successful; and,
   requesting the history list from the composition store when the connection with the network service is successful.

16. A computer program product comprising a computer usable medium having computer readable program codes embodied in the medium that when executed causes a computer to:
   receive, on behalf of a user, a new imaging composition from a network service, the imaging composition having links to imaging data to be serviced as a single unit, the imaging data associated with the user through a user profile;
   save said new imaging composition to the composition store of a personal imaging repository associated with the user through the user profile;
   add said new imaging composition to a history list maintained by the composition store; and, provide the history list to the user associated with the personal imaging repository responsive to a request for the history list.

17. A system for providing a history list of imaging compositions for a user, comprising:
   a means for receiving, on behalf of the user, a new imaging composition from a network service, the imaging composition having links to imaging data to be serviced as a single unit, the imaging data associated with the user through a user profile;
   a means for saving said new imaging composition to a composition store of a personal imaging repository associated with the user; through the user profile;
   a means for adding said new imaging composition to a history list maintained by the composition store; and,
   a means for providing the history list to the user associated with the personal imaging repository responsive to a request for the history list.

* * * * *